Patented Mar. 1, 1927.

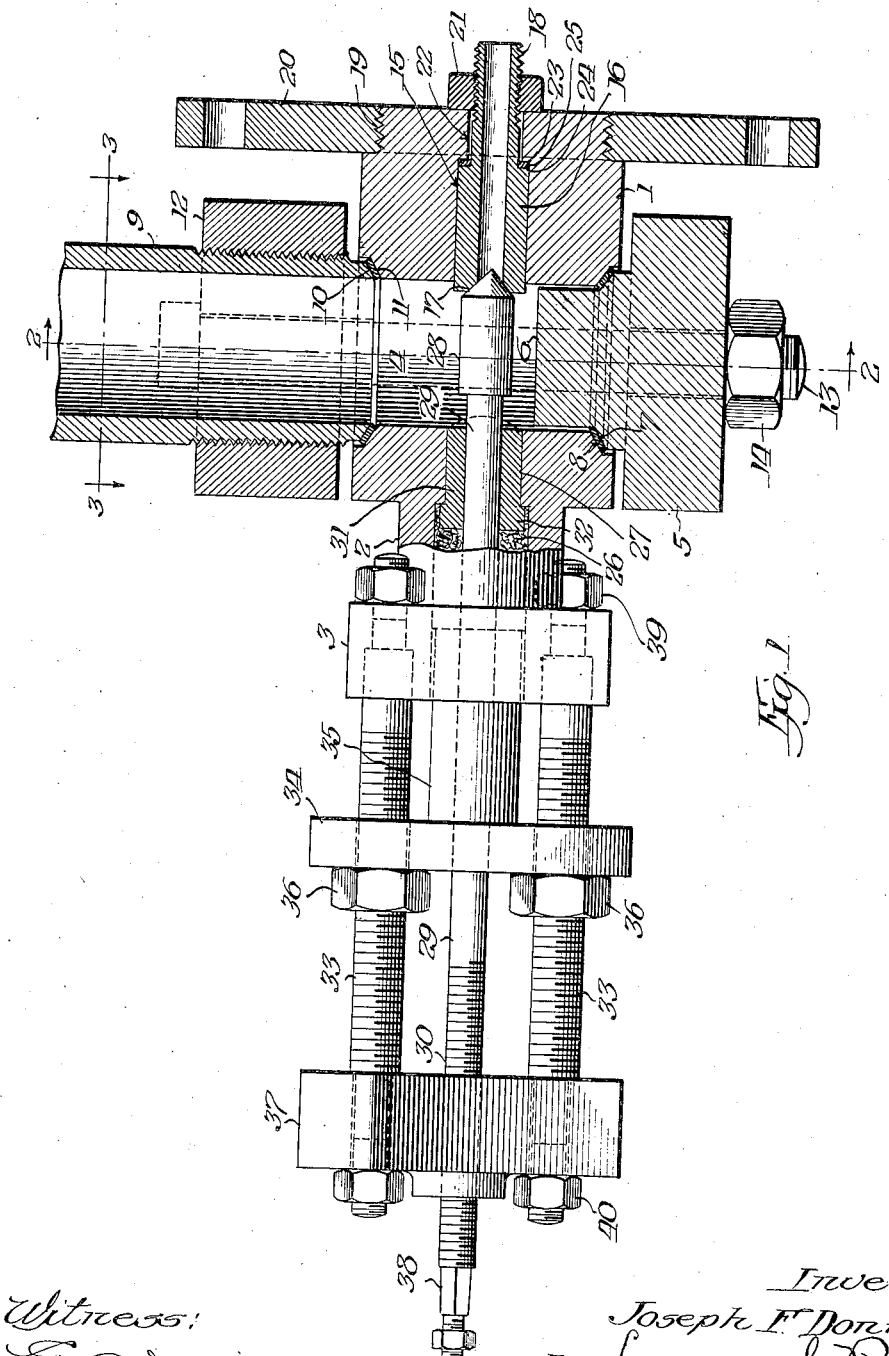

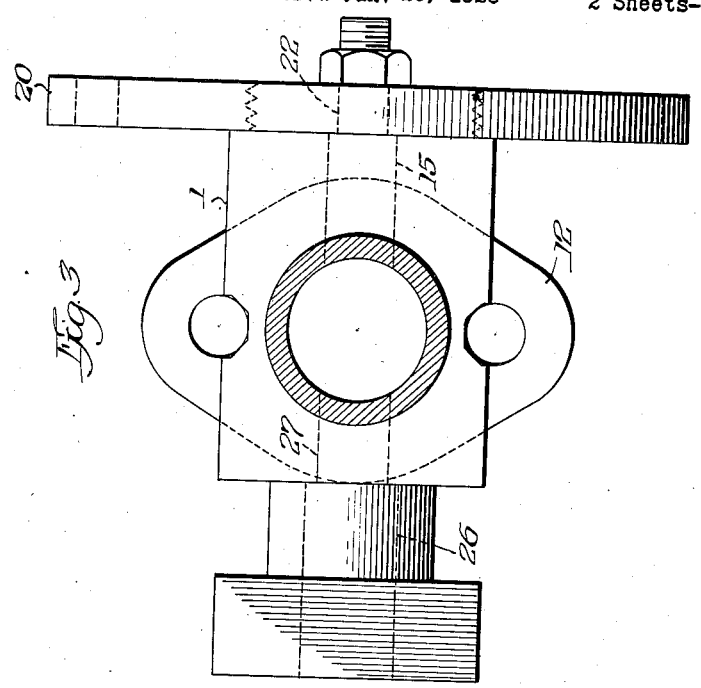
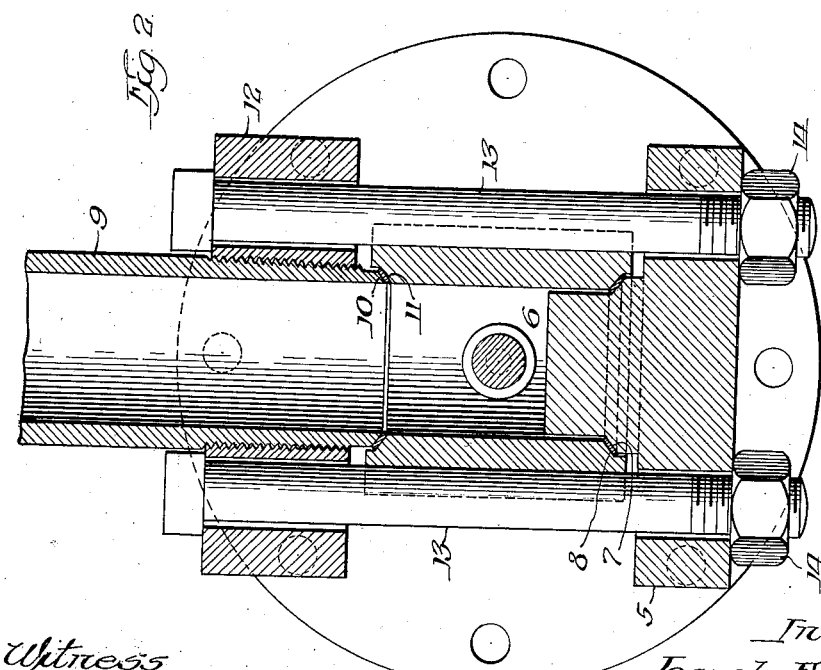

1,619,335

UNITED STATES PATENT OFFICE.

JOSEPH FRANCIS DONNELLY, OF LEMONT, ILLINOIS.

APPARATUS FOR CONTROLLING FLUIDS.

Application filed January 25, 1926. Serial No. 83,545.

This invention relates to a valve which is particularly adapted to control fluids at high temperatures and pressures.

An object of my invention is to provide a valve in which the controlling means are located outside the body which is subjected to high temperature and in which the parts which are frequently adjusted are so located as to have free access thereto and be unaffected by the high temperature imparted to the main body by the heated fluid controlled thereby.

A further object of my invention is to provide an adjusting means for a compression gland which can be operated at a point removed from the gland in such a manner as to give perfect freedom of movement to the tool used for this purpose.

Another object is to provide a valve stem and head which is readily removable from the body of the valve and a mechanism adapted to operate said stem and head from a position outside the body of the valve.

Another object is to provide a valve body and packing box in one piece.

Another object is to provide a removable bottom for the packing box, which also forms a closing member between the packing box and the exterior of the valve body.

Another object is to provide a removable seat for the valve head which is held in position in the body of the valve by a locking means on the exterior of said valve body.

A further object is to provide a valve in which the parts subjected to the fluid under high temperature and pressure may be made of steel so as to efficiently operate under such temperatures and pressures.

A further object is to provide a valve in which threaded joints are avoided, where such joints come in contact with the highly heated fluid.

Other objects will appear from the following detailed description of an embodiment of my invention, in which—

Figure 1 is a longitudinal view partly in cross section;

Fig. 2 is a cross section on line 2—2, Fig. 1;

Fig. 3 is a plan view on line 3—3, Fig. 1.

In the drawings, 1 is the body of the valve which has an extension 2 thereon formed at its outer end with a flange 3. The body 1 has a central chamber 4 preferably formed by a transverse bore extending through the same. One of the open ends of said chamber or bore is closed by a flanged member 5 having a projection 6 thereon and an annular seat 7 mating with a seat 8 on the body so as to form a fluid-tight contact therewith when held in closed position. A gasket may be interposed between the seats 7 and 8 as shown. In the other open end of said bore is fitted a pipe 9 in such a manner that the end of said pipe which is formed with an annular seat 10, is caused to make fluid-tight contact with an annular seat 11 on said body. A gasket may be interposed between the seats 10 and 11 as shown. The pipe 9 is threaded through a flange 12. The flange 12 and flange 5 are connected by a pair of bolts 13 having nuts 14 thereon, by which means the flanges 12 and 5 may be drawn inwardly toward each other thus causing the seats 7 and 10 to be firmly held against the seats 8 and 11. The body 1 is provided with an axial bore 15 forming a passage in which is inserted a removable tubular member 16 preferably of tempered steel, having its inner end formed so as to provide a valve seat at 17 and its outer end formed so as to provide a threaded extension 18, which extends outwardly beyond the end of the body member 1. The body member 1 is formed at its inner end with a reduced threaded portion 19 which is threaded into a supporting flange 20. A nut 21 is threaded on the extension 18 of the member 16 and is adapted to bear against the end of the reduced portion 19. The outer end of the bore 15 has a reduced portion 22 through which the reduced extension 18 of the tubular member 16 passes. By this construction, a shoulder 23 is formed on the body member which mates with a shoulder 24 formed on the tubular member 16. A packing 25 may be inserted between the shoulders 23 and 24. By turning the nut 21 the shoulder 24 is pressed toward the shoulder 23, thus forming a fluid-tight seal at this point. The body 1 is provided with an axial bore forming a passage 26 passing through the extension 2 and having a reduced portion 27 at the inner end thereof. Through the bore 26 is inserted a valve head 28 having a stem 29 threaded at its outer end 30. A bushing 31 is inserted in the reduced portion 27 of the bore 26 through which the stem 29 passes. The bushing 31 is provided with a flange 32 which seats against the outer end of the reduced portion 27.

Mounted on the flange 3 are threaded pillar posts 33. The pillar posts 33 pass through a flange 34 which carries a compression gland 35 through which the stem 29 passes. The compression gland passes into the bore 26 wherein a packing is placed between the inner end of said gland and the flange 32 of the bushing 31. Nuts 36 are threaded on the pillar posts 33 above the flange 34. By rotation of the nuts 36 the gland 35 may be advanced so as to compress said packing and form a fluid-tight seal around the stem 29 within the bore 26.

A detachable head block 37 is mounted on the outer end of said pillar posts through which is threaded the end 30 of the stem 29. By this construction a rotation of the stem 29 will cause a longitudinal adjustment of the valve head 28 with respect to the seat 17. The outer end of the stem 29 is provided with a squared head 38 adapted for the attachment of a crank or suitable operating member for rotating the stem 29. The pillar posts 33 pass through the flange 3 and head 37 and are held in position therein by nuts 39 and 40 as shown.

In the operation of my device the fluid is passed through the pipe 9 into the chamber 4 and from thence through the tubular member 16. If desired a conduit may be attached to the threaded end of the tubular member 16 for conducting the fluid to any desired point, or a flanged coupling may be attached to the flange 20. If desired a conduit may be attached to the threaded end 19 of the body member. The valve head 28 and stem 29 may be easily and quickly removed from the body 1. This is accomplished by removing the nuts 39 and withdrawing an assembly comprising the pillar posts 33 with the attached mechanism, at which time the valve head 28 and stem 29 together with the bushing 31 pass through the bore 26. After the removal of these parts the tubular member 16 may be removed by removing the nut 21 and passing the tubular member 16 through the bore 26.

It will be seen that the operating parts of my valve are situated at a distance from the body and are easily accessible for manipulation, adjustment and removal. Those parts which are subject to wear and exposed to the heat of the fluid are easily removed for repair or replacement.

Having described my invention, what I claim is:—

1. A fluid-controlling device comprising a body having a chamber therein and a pair of opposed passages communicating with said chamber and leading to the exterior of said body, means for admitting a fluid into said chamber, means adapted to be inserted into and removed from said passages through one of said passages for controlling the flow of fluid from said chamber through the other passage said inserted means including a tubular member in one of said passages having a valve seat thereon, and a valve head operating against said seat, and means located without said body adapted to hold said tubular member in position.

2. A fluid-controlling device comprising a body having a chamber therein and a pair of opposed passages communicating with said chamber and leading to the exterior of said body, means for admitting a fluid into said chamber, means for controlling the flow of fluid from said chamber through one of said passages including a tubular member having a valve seat thereon and a valve head operating against said seat adapted to be inserted and removed from said passages through the other passage of said pair of passages, a stem connected to said valve head, and means located at the outer end of said stem adapted to actuate said stem so as to adjust said head relative to said seat.

3. A fluid-controlling device comprising a body having a chamber therein and a pair of opposed passages communicating with said chamber and leading to the exterior of said body, means for admitting a fluid to said chamber, means for controlling a flow of said fluid from said chamber through one of said passages including a tubular member having a valve seat thereon and a valve head operating against said seat adapted to be inserted and removed from said passages through the other passage of said pair of passages, a stem connected to said valve head, a head block located at the outer end of said stem, means mounted on said body adapted to support said head block, the outer end of said stem and head block being so formed that relative motion therebetween will cause an adjustment of said valve head relative to said seat.

4. A fluid-controlling device comprising a body having a chamber therein and a pair of opposed passages communicating with said chamber and leading to the exterior of said body, an integral extension on said body through which one of said passages passes, means for admitting a fluid into said chamber, means for controlling the flow of said fluid from said chamber through the opposite passage including a tubular member having a valve seat thereon extending through said opposite passage and a valve head and stem adapted to be inserted and removed through said passage passing through said extension, and means for operating said valve head and stem removably mounted on said extension.

5. A fluid-controlling device comprising a body having a chamber therein and a pair of opposed passages communicating with said chamber and leading to the exterior of said body, an integral extension on said body through which one of said passages passes, means for admitting a fluid into said chamber, means for controlling the flow of said fluid from said chamber through the opposite passage including a tubular member having a valve seat thereon extending through said opposite passage and a valve head and stem adapted to be inserted and removed through said passage passing through said extension, means mounted on said extension for operating said valve head and stem, and means for sealing said passage through said extension from the fluid in said chamber.

6. A fluid-controlling device comprising a body having a chamber therein and a pair of opposing passages communicating with said chamber and leading to the exterior of said body, an integral extension on said body through which one of said passages passes, means for admitting a fluid into said chamber, means for controlling a flow of said fluid from said chamber through the opposite passage including a tubular member having a valve seat thereon extending through said opposite passage and a valve head and stem adapted to be inserted and removed through said passage passing through said extension, means mounted on said extension for operating said valve head and stem having supporting members removably attached to said extension, a bushing in the inner end of said passage in said extension through which said stem passes, and a compression means carried by said supporting members adapted to compress a packing between it and said bushing.

7. A fluid-controlling device comprising a body having a chamber therein provided with inlet and outlet passages and an integral extension thereon having a passage therethrough, a valve for controlling said outlet passage adapted to be inserted through said passage in said extension and having a stem extending outwardly to a point remote from said body, and means located at the outer end of said stem for operating said valve, supporting means for said stem removably mounted on said extension, a packing surrounding said stem in said passage in said extension, compression means for said packing mounted on said supporting means, and means on said supporting means adapted to operate said compression means.

8. A fluid-controlling device comprising a body having a chamber therein provided with inlet and outlet passages and an integral extension thereon having a passage therethrough, packing in said passage in said extension, a compression gland therefor, a valve for controlling said outlet passage adapted to be inserted through said passage in said extension having a stem extending outwardly to a point remote from said body, a head block through which the outer end of said stem is threaded and a plurality of pillar posts mounted on said extension adapted to support said head block.

9. A fluid-controlling device comprising a body having a chamber therein provided with inlet and outlet passages and an integral extension thereon having a passage therethrough, a valve for controlling said outlet passage adapted to be inserted through said passage in said extension and having a stem extending outwardly to a point remote from said body, a head block through which the outer end of said stem is threaded, a plurality of threaded pillar posts mounted on said extension adapted to support said head block, packing in said passage in said extension, a compression gland for said packing extending into said passage having threaded means mounted on said pillar posts adapted to force said compression gland into operative position.

10. A fluid-controlling device comprising a body having a chamber therein provided with inlet and outlet passages, said outlet passage having a reduced portion at its outer end forming a shoulder on said body, a valve for controlling said outlet passage, a tubular member having a valve seat and shoulder thereon adapted to be inserted in said outlet passage, an extension on said tubular member extending outwardly beyond said body, and a nut threaded on said extension adapted to bear against said body and draw said shoulder on said tubular member against said shoulder on said body so as to form a fluid seal at this point and firmly hold said tubular member in position.

11. A fluid-controlling device comprising a body having a passage therethrough, a pair of opposed passages communicating with said first named passage, means for supplying a fluid to one end of said first named passage and closing the other end thereof, and means adapted to be inserted into and removed through one of said pair of opposed passages for controlling a flow of fluid from said first named passage through the other passage of said pair of passages.

12. A fluid-controlling device comprising a body having a passage therethrough, a fluid-conducting pipe connected to one end of said passage and a closure member closing the opposite end of said passage, and means connecting said pipe and closure member adapted to hold them in operative position.

13. A fluid-controlling device comprising a body having a passage therethrough and annular recesses at the ends of said passage, a pipe having its end formed so as to mate with one of said recesses at one end of said passage, a flange attached to said pipe, a closure member having an annular shoulder thereon adapted to mate with the annular recess at the other end of said passage, a flange on said closure member, and connecting means between said flanges adapted to draw said pipe and closure member into fluid-tight contact with said body.

Signed at Chicago, Illinois, this 18th day of January, 1926.

JOSEPH FRANCIS DONNELLY.